United States Patent
Lin et al.

(10) Patent No.: US 7,822,752 B2
(45) Date of Patent: Oct. 26, 2010

(54) EFFICIENT RETRIEVAL ALGORITHM BY QUERY TERM DISCRIMINATION

(75) Inventors: Chenxi Lin, Beijing (CN); Lei Ji, Beijing (CN); Huajun Zeng, Beijing (CN); Benyu Zhang, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 11/804,627

(22) Filed: May 18, 2007

(65) Prior Publication Data

US 2008/0288483 A1    Nov. 20, 2008

(51) Int. Cl.
 G06F 7/00    (2006.01)
 G06F 17/30    (2006.01)
(52) U.S. Cl. .................. 707/748; 707/758; 707/769
(58) Field of Classification Search .......... 707/1–5, 707/713, 715, 736, 741, 748, 758, 769
See application file for complete search history.

(56) References Cited

U.S. PATENT DOCUMENTS

| | | | |
|---|---|---|---|
| 5,263,159 A | 11/1993 | Mitsui | |
| 5,765,150 A | 6/1998 | Burrows | |
| 5,915,249 A * | 6/1999 | Spencer | 707/5 |
| 5,920,859 A | 7/1999 | Li | |
| 6,349,308 B1 | 2/2002 | Whang et al. | |
| 7,062,483 B2 | 6/2006 | Ferrari et al. | |
| 7,111,000 B2 | 9/2006 | Wen et al. | |
| 2004/0143564 A1 | 7/2004 | Gross et al. | |
| 2004/0267725 A1 | 12/2004 | Harik | |
| 2005/0138067 A1 * | 6/2005 | Billsus et al. | 707/104.1 |
| 2005/0198076 A1 | 9/2005 | Stata et al. | |
| 2005/0267872 A1 * | 12/2005 | Galai et al. | 707/3 |
| 2006/0041560 A1 * | 2/2006 | Forman et al. | 707/10 |
| 2006/0047656 A1 * | 3/2006 | Dehlinger et al. | 707/6 |
| 2006/0259482 A1 | 11/2006 | Altevogt et al. | |
| 2006/0277173 A1 | 12/2006 | Li et al. | |
| 2007/0185871 A1 * | 8/2007 | Canright et al. | 707/7 |
| 2007/0198459 A1 * | 8/2007 | Boone et al. | 707/1 |

OTHER PUBLICATIONS

Cuenca-Acuna, et al., "Text-Based Content Search and Retrieval in ad hoc P2P Communities", Date: Apr. 4, 2002, pp. 1-13, Piscataway, New Jersey, USA.

Moffat, et al., "Self-Indexing Inverted Files for Fast Text Retrieval", Date: Feb. 1994, pp. 1-29, Victoria, Australia.

Robertson, Stephen; "Understanding inverse document frequency: on theoretical arguments for IDF;" Journal of Documentation; 2004; vol. 60; pp. 503-520.

* cited by examiner

*Primary Examiner*—Hung T Vy
*Assistant Examiner*—Angela M Lie

(57) ABSTRACT

Described is an efficient retrieval mechanism that quickly locates documents (e.g., corresponding to online advertisements) based on query term discrimination. A topmost subset (e.g., two) of search terms is selected according to their ranked importance, e.g., as ranked by inverted document frequency. The topmost terms are then used to narrow the number of rows of an inverted query index that are searched to find document identifiers and associated scores, such as computed offline by a BM25 algorithm. For example, for each document identifier of each important term, a fast search within each of the narrowed subset of rows (that also contain that document identifier) may be performed by comparing document identifiers to jump a pointer within each other row, followed by a binary search to locate a particular document. The scores of the set of particular documents may then be used to rank their relative importance for returning as results.

16 Claims, 5 Drawing Sheets

EFFICIENT RETRIEVAL ALGORITHM BY QUERY TERM DISCRIMINATION

BACKGROUND

Information retrieval technology is widely used in web search engines. One information retrieval technology generally employed is inverted indexing, in which a list of the documents that contain any supported word is maintained in a data structure (index table) in association with that word. Then, when processing a search term, the inverted index is used to speed up the retrieval process by accessing the inverted index table with that term to locate the documents that contain that term.

However, when the data scale is large enough, scanning the index table is still time consuming. For example, consider attempting to retrieve relevant content from tens of millions of documents in a rapid time, such as thirty milliseconds. Conventional inverted indexing is not capable of meeting such retrieval demands.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an efficient retrieval mechanism quickly locates documents based on query term discrimination. In general, as a query is parsed into search terms, a topmost subset (e.g., two) of the search terms is selected according to their ranked importance. For example, each term's inverted document frequency may be used to determine its relative importance. The topmost terms are then used to narrow the number of rows of an inverted query index that are searched to find documents (e.g., by document identifiers) associated with scores with respect to terms, (such as computed offline by using a BM25 algorithm).

A fast search within the rows may be performed by selecting a document identifier within a row of the index corresponding to a topmost term, and then locating other rows in the index that contain that document identifier. Within each of those rows, a pointer is moved to a particular document, including by jumping within the row based on a comparison of the document identifiers until two jump points are located (corresponding to document identifiers) which the selected document identifier of the topmost row is between. A binary search between the jump points hones in on the particular document. The process then repeats for the other documents identifiers in the other topmost subset, resulting with a set of particular document identifiers, each of which is associated with a score than may then be used to rank documents based on relevance into a result set. For example, the result set may correspond to advertisements that are relevant to a query, which then may be provided back to the source of the query.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an efficient retrieval mechanism (algorithm) that is based on query term discrimination. As will be understood, given a query, this retrieval mechanism first selects a set of the most important items from an index table (matrix) to be candidate items, and then uses a merge algorithm to calculate scores of items for ranking a result set. This algorithm is as highly accurate as traditional retrieval algorithms, yet at the same time is significantly more efficient.

As will be understood, the examples herein are directed towards using an efficient retrieval mechanism for ranking advertisements for relevance with respect to a query. Such a business model/system may be used where web pages include advertisements, in which advertisers pay for hits on their links; it is thus more profitable to locate and return advertisements that are more relevant to a search, as users will more likely click on relevant advertisements than irrelevant ones.

However, as will be understood, the various aspects of the efficient retrieval mechanism are independent of any particular business or revenue model with respect to searching. Indeed, any set of documents set may be searched for relevance using the example mechanisms described herein. As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used various ways that provide benefits and advantages in computing and information retrieval technology in general.

Figure 1:
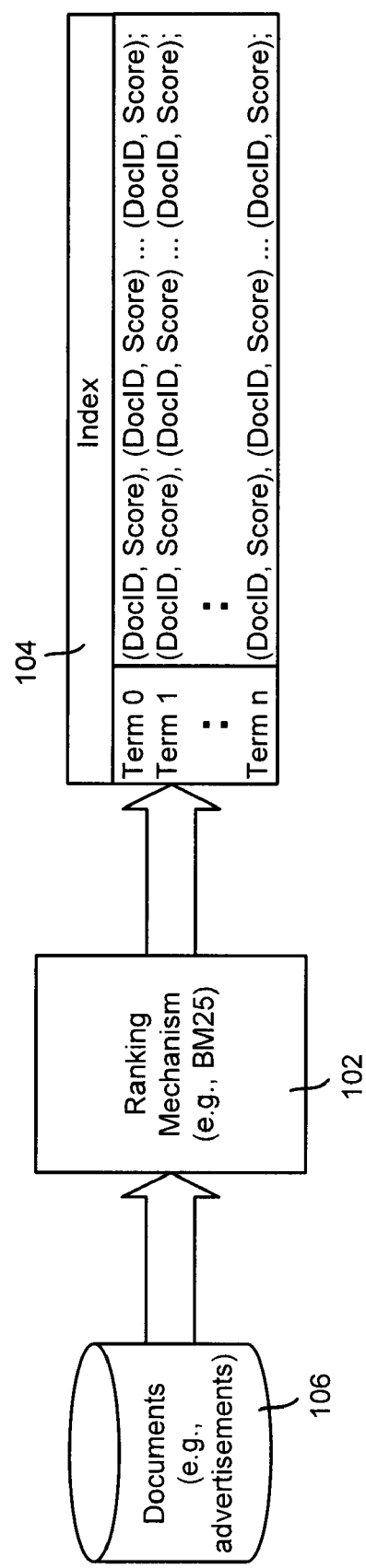
FIG. 1 is a block diagram representing an example system for building an inverted query index that associates a set of documents and a score for each document for finding via a term.

Turning to FIG. 1, there is shown an offline, pre-calculation system, including a ranking mechanism 102 that constructs an index 104 of terms from a set of documents 106. Note that as used herein, the concept of a "term" includes any single entity that can be represented in a data structure, such as a word, symbol, shape and so forth, and/or any phrase comprising a plurality of such entities. Each row of the index comprises a term, and a set of one or more document identifiers and score pairs (DocId, score), each pair corresponding to a document in which that term appears. The score computed for each document with respect to each term is described below. For an advertising model, the documents may be advertisements that are relevant to search terms.

In one example implementation, to rank the relevance of advertisements in the system, a BM25 (Okapi) algorithm is used. More particularly, with respect to BM25 scoring, a ranking formula provides a mechanism for computing the IR (information retrieval) score of a document based on a combination of some frequently used document features, namely term frequency (TF), document frequency (DF), and document length. The basic formula of BM25 is:

$$\sum_{T \in Q} w^{(1)} \frac{(k_1 + 1)tf}{K + tf} \frac{(k_3 + 1)qtf}{k_3 + qtf}$$

where Q is a query, containing terms T, $w^{(1)}$ is the Robertson/Sparck Jones weight of T in Q $$\log \frac{(r + 0.5)/(R - r + 0.5)}{(n - r + 0.5)/(N - n - R + r + 0.5)}.$$

Further, N is the number of items (documents) in the collection, n is the number of documents containing the term, R is the number of documents known to be relevant to a specific topic, and r is the number of relevant documents containing the term.

K is $k_1((1-b)+b \cdot dl/avdl)$ where $k_1$, b, $k_2$, and $k_3$ are parameters that depend on the on the nature of the queries and (possibly) on the database. In one previous Text Retrieval Conference (TREC-7) configuration, $k_1$ was 1.2 and b was 0.75 (except where stated otherwise); $k_2$ was always zero and $k_3$ ranged from 0 to 1000. Further, tf is the frequency of occurrence of the term within a specific document, qtf is the frequency of the term within the topic from which Q was derived, and dl and avdl are the document length and average document length (in arbitrary units), respectively.

Pre-Calculation:

$$S = \sum_{T \in Q} w^{(1)} \frac{(k_1 + 1)tf}{K + tf}$$

Online ldf Calculation:

$$ldf_q = \frac{(k_3 + 1)qtf}{k_3 + qtf}$$

Generally, inverted indexing technology is used to speed up online retrieval. Inverted indexing technology uses an indexing table comprising a matrix. The BM25 score for each document is calculated offline and stored in the matrix for later online retrieval. Each row of the matrix is for a term (that will correspond to a search term). The BM25 score for each document is stored in association with its document identifier, e.g., as a (docId, score) pair, with the pairs for each term sorted by the document identifier.

Figure 2:
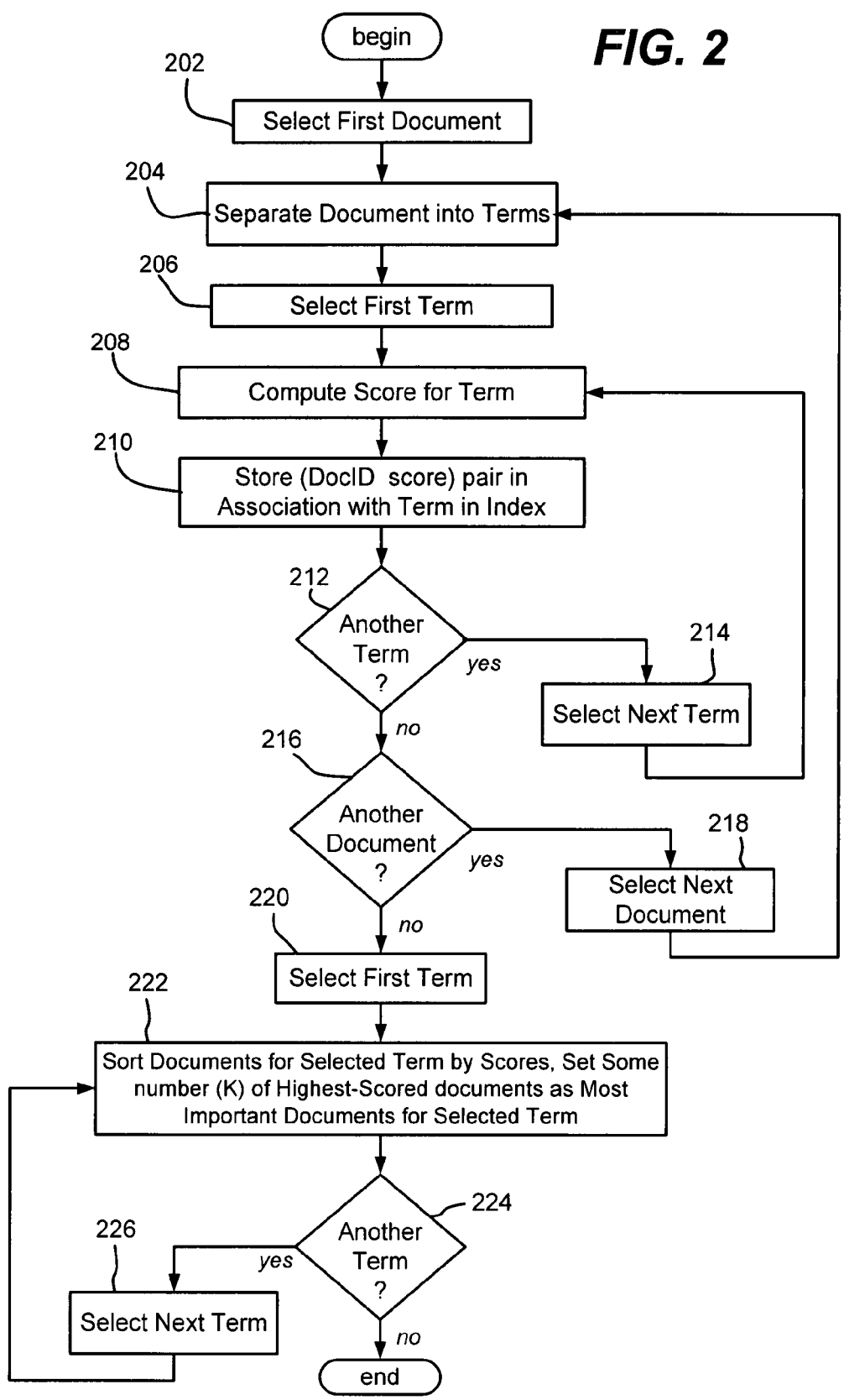
FIG. 2 is a flow diagram representing example steps taken to build the inverted query index.

FIG. 2 summarizes the offline index construction process. Documents are processed by selecting one (step 202), and separating the document into terms (step 204). Note that some terms that are not relevant to searching such as "a" and "the" may be filtered out at this step. For each term (beginning at step 206) in the document, a score (e.g., the BM25 score described above) is computed, as represented via step 208, and the score stored along with the document identifier (DocId, score) in the index 104 in association with that term as represented via step 210.

Steps 212 and 214 repeat the process for the other terms in that document. Steps 216 and 218 repeat the process for the other documents.

Steps 220, 224 and 226 then walk through the index, and using the scores, determine some number (K) of the most important documents for each term. The other documents for each may be discarded from the index, or otherwise marked as unimportant. At this time, for each term, the 104 index contains document identifiers for the most important documents for that term, along with a score for each document identifier. The index may then be used to process an online query, as described below with reference to FIGS. 3 and 4.

Figure 3:
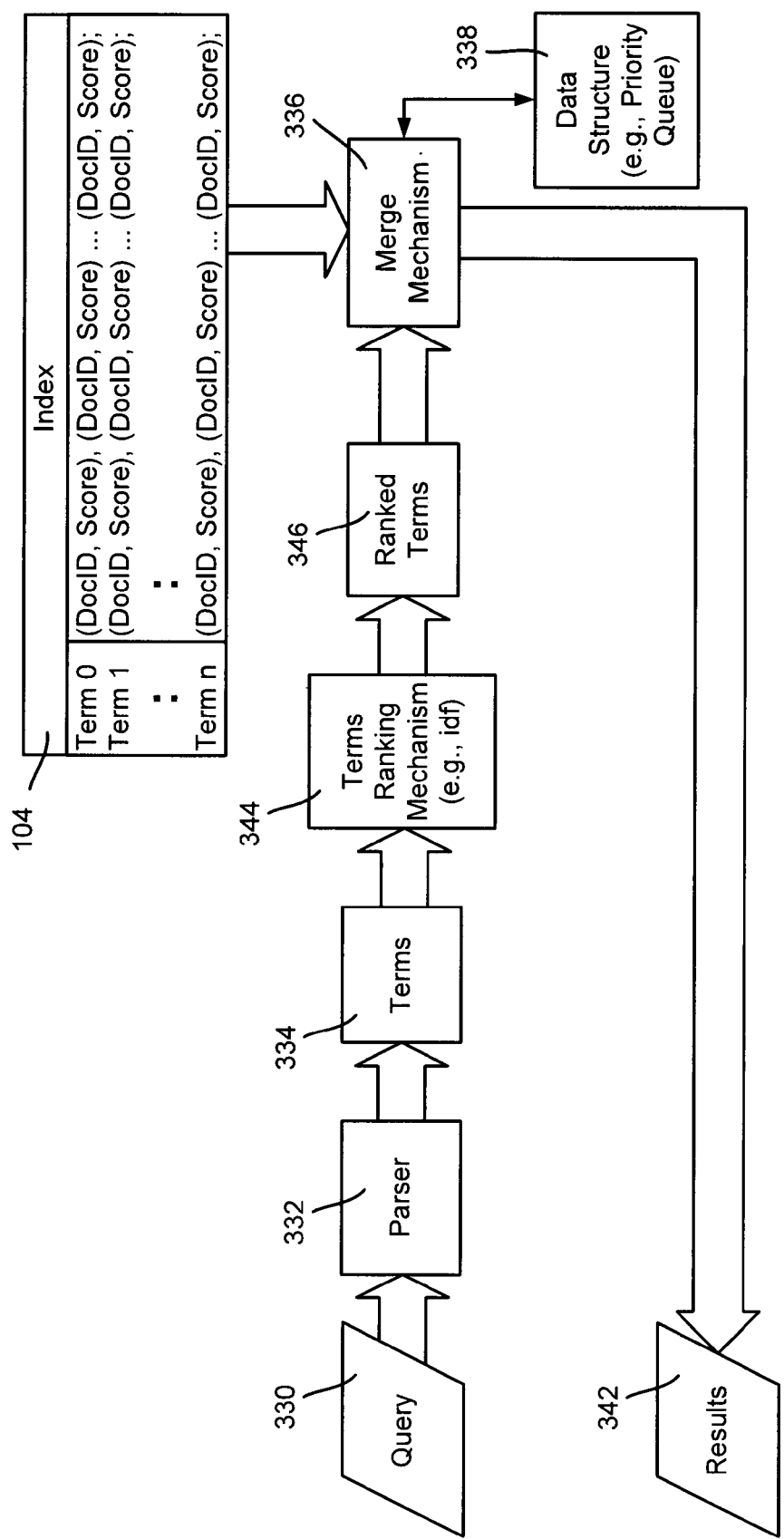
FIG. 3 is a block diagram representing an example system for processing a query to locate relevant documents via an efficient retrieval algorithm based upon query term discrimination.

More particularly, as represented in FIG. 3, when a query 330 is submitted, the query 330 is parsed (by a parser 332) into search terms 334, each of which (typically) corresponds to a term having a row in the index/matrix 104. The result set for a search is generally based on processing several rows, using a merge algorithm 336 (described below) to calculate the final score of each document with respect to likely relevance.

To construct the result set 342, a merge algorithm uses a data structure 338 (e.g., a priority queue), which may be implemented by a heap or a loser tree (which tracks the lesser scores). The total time complexity is $$O\left(\sum_{0 \leq i < n} L_i \log n\right),$$

where n is the term number in the query and $L_i$ is the length of the row for the i-th term, $term_i$. In this approach, the results 342 are in the document set $$\bigcup_{0 \leq i < n} Doc_{term_i}.$$

However, instead of searching all documents, the query term discrimination approach as implemented in the merge mechanism/algorithm 336 described herein searches the results only in what are determined to be the important document sets, and for what are determined to be the important query terms. Recall that in the offline pre-calculation, the documents for each term are sorted by the BM25 scores, with some number (K) of the highest-scored documents selected as the important documents for that term.

Figure 4:
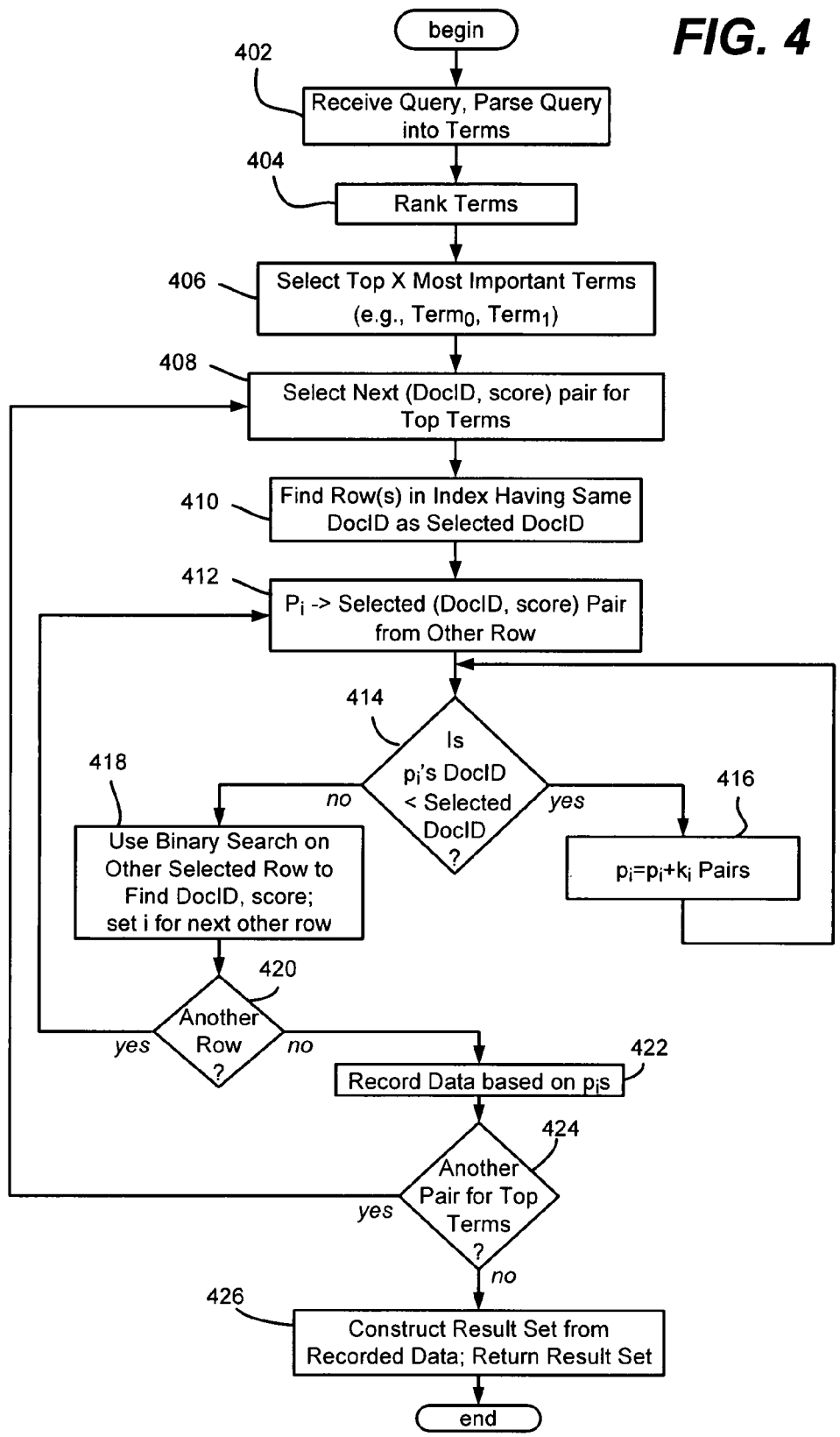
FIG. 4 is a flow diagram representing example steps taken to process a query to locate relevant documents via an efficient retrieval algorithm based upon query term discrimination.

FIG. 4 summarizes the general operations, beginning when a query 330 is submitted and parsed into the terms 334 (step 402), and the terms 334 are ranked (step 404) by a terms ranking mechanism 344 to determine and rank the important terms 346 for that query. For example, the inverted document frequency (idf) may be used by the terms ranking mechanism 344 as the selection mechanism, that is, the lower the idf for a given term, the more important that term is.

Then, from the ranked terms 346, as represented by step 406, some number X of terms (e.g., two) are selected by the merge mechanism 336 as the most important search terms for this query. For example, selecting the two most important terms (referred to in this example as $term_0$ and $term_1$), the results in the index 104 for the set of documents for those terms ($Doc_{term_0} \cup Doc_{term_1}$) may be searched.

In this example, using these two most important terms and the index 104, the merge mechanism (algorithm) 336 ranks the best results. The time complexity is $$O\left(2ns + s\log \prod_{0 \leq i < n} k_i\right),$$

where s is the size of the important document set for the important terms (the size of the document sets of $term_0$ and $term_1$), and $k_i$ represents that the size of the document set is $k_i$ times of s for any given $term_i$. In other words, if $s_i$ is the size of document set of $term_i$, then $k_i = s_i/s$.

The merge mechanism 336 operates by scanning the (docId, score) pairs of the two most important terms (the pair elements of the set $Doc_{term_0} \cup Doc_{term_1}$) one by one, to find pairs having that same docId in the other rows of the index table. To this end, step 408 selects a pair from the important term set, and step 410 finds the other rows in the index having that document identifier within that row. For those rows, there is a pointer ($p_i$) assigned to stand for that row's current scanning position (step 412).

As represented by step 414, the docId corresponding to $p_i$ is compared with the current docId of the pair being scanned in the set of documents of the two most important terms, $Doc_{term_0} \cup Doc_{term_1}$. If the docId in $p_i$ is smaller than the docId of the scanned pair, via step 416 $p_i$ is advanced (jumps over) $k_i$ pairs, (where $k_i$ is set forth above). In other words, the pointer for the other row being evaluated is moved up, $p_i += k_i$.

Following a jump at step 416, the comparison is performed again at step 414. If the docId at the pair pointed to by $p_i$ is still smaller, the mechanism repeats the jump. If not smaller, a binary search is used (step 418) to hone in on a pair within the last two jumps; i is then set to indicate the next other (non-top two) row.

Step 420 repeats the process for all other rows that contain a document identifier that matched one in the current pair selected from most important term rows. When the rows for that current pair are processed in this way, those rows data pairs (each pointed to by the pointer $p_i$) are recorded (step 422). Then via steps 424 and 408, the next pair in the important term rows is selected, and the process repeated until no pairs of the top two most important terms remain to be scanned.

At this time, the result set 342 may be constructed based on the recorded data pairs, with the documents ranked by their scores. Step 426 represents returning the result set.

As can be seen, for each term of every query, the merge mechanism 336 jumps s times and uses a binary search s times in a zone with the size $k_i$. Using this retrieval algorithm greatly improves the relevant document retrieval performance. At the same time, because the most important documents are scanned, the accuracy does not decrease.

Exemplary Operating Environment

Figure 5:
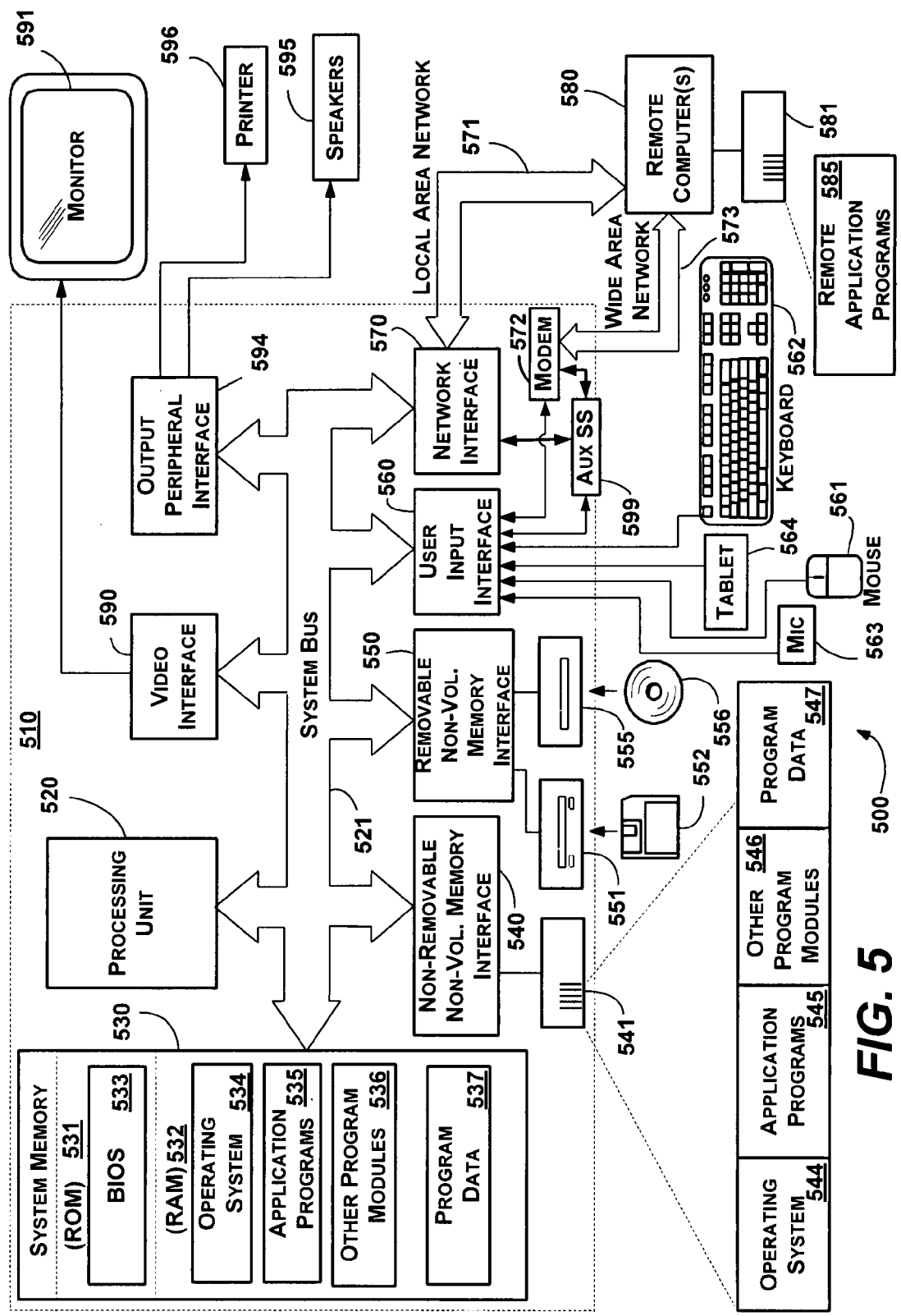
FIG. 5 shows an illustrative example of a general-purpose network computing environment into which various aspects of the present invention may be incorporated.

FIG. 5 illustrates an example of a suitable computing system environment 500 on which the ranking mechanisms of FIG. 1 and/or FIG. 3 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
   a ranking mechanism that ranks terms of a query based on one or more importance criteria into a set of ranked terms; and
   a merge mechanism that searches an index of terms, at least one term having a set of one or more document identifiers associated with a score and identifying a data structure that contains the at least one term, the merge mechanism configured to:
   search the index by choosing a topmost subset of the ranked terms based on a ranked importance of individual ranked terms; and
   search for documents in a subset of rows of the index, the subset of rows selected by having a relationship with at least one document identifier corresponding to a term of the topmost subset of the ranked terms, wherein the merge mechanism is configured to search for the documents by locating one or more particular documents within at least one row of the subset of rows by jumping within the at least one row to one or more jump points corresponding to associated document identifiers in the at least one row, wherein the jumping is based on a comparison of one or more document identifiers within the at least one row and a reference document identifier within another row corresponding to the topmost subset of the ranked terms; and at least one computing device configured to implement one or both of the ranking mechanism or the merge mechanism.

2. The system of claim 1 wherein the topmost subset of the ranked terms comprises two ranked terms of the set of ranked terms as determined according to the one or more importance criteria.

3. The system of claim 1 wherein the one or more importance criteria includes an inverted document frequency of individual terms of the query.

4. The system of claim 1 wherein the merge mechanism is configured to locate the one or more particular documents by further performing a binary search between one of the jump points that is less than the reference document identifier, and another of the jump points that is greater than the reference document identifier.

5. The system of claim 1 further comprising means for building the index from a document set that includes the documents, wherein the index is built in an offline state independent of providing results based on one or both of the query or another query.

6. The system of claim 1 wherein the one or more document identifiers correspond to advertisements.

7. A computer-readable storage medium having computer executable-instructions, which when executed perform steps comprising:

(a) parsing a query into terms;

(b) ranking the terms based on one or more importance criteria into a set of ranked terms;

(c) selecting a subset of the set of ranked terms as a most important term set;

(d) selecting as a selected row of an inverted query index a row that corresponds to the most important term set;

(e) for a document identifier in the selected row, finding other rows in the inverted query index that have a matching document identifier;

(f) moving a pointer in individual other rows based upon a comparison of the document identifier in the selected row with the individual other rows' matching document identifiers, followed by one or more binary searches, to locate particular documents in the other rows; and (g) using a score associated with the other rows' matching document identifiers to rank the particular documents for returning as a result set.

8. The computer-readable storage medium of claim 7, wherein the computer-executable instructions, when executed, further perform a step comprising selecting as a new selected row a different row that corresponds to the most important term set, and returning to step (d).

9. The computer-readable storage medium of claim 7, wherein ranking the terms based on one or more importance criteria includes ranking the terms based on an inverted document frequency for each term, and wherein selecting the subset of the ranked terms as the most important term set comprises selecting two terms having a lower inverted document frequency.

10. The computer-readable storage medium of claim 7, wherein moving the pointer in individual other rows further includes performing at least one of the one or more binary searches between one jump point corresponding to an associated document identifier in one other row of the other rows that is less than the document identifier within the selected row, and another jump point corresponding to another associated document identifier in the one other row that is greater than the document identifier within the selected row.

11. The computer-readable storage medium of claim 7, wherein the computer-executable instructions, when executed, further perform a step comprising building the inverted query index in an offline state from a set of documents corresponding to advertisements.

12. A method comprising:

parsing a query into terms;

ranking the terms based on one or more importance criteria into a set of ranked terms;

selecting a subset of the set of ranked terms as a term set;

selecting, as a selected row, a row of an inverted query index that corresponds to the term set;

for a document identifier in the selected row, finding other rows in the inverted query index that have a matching document identifier;

moving a pointer in individual other rows based upon a comparison of the document identifier in the selected row with the individual other rows' matching document identifiers, followed by one or more binary searches, to locate particular documents in the other rows; and using a score associated with the other rows' matching document identifiers to rank the particular documents for returning as a result set, wherein at least one of parsing the query, ranking the terms, selecting the subset of the ranked terms, selecting the row, finding the other rows, moving the pointer, or using the score is implemented by at least one computing device.

13. The method of claim 12, further comprising selecting, as a new selected row, a different row that corresponds to the term set.

14. The method of claim 12, wherein ranking the terms based on one or more importance criteria includes ranking the terms based on an inverted document frequency for each term, and wherein selecting the subset of the ranked terms comprises selecting two terms having a lower inverted document frequency.

15. The method of claim 12, wherein moving the pointer in individual other rows includes performing at least one of the one or more binary searches between one jump point corresponding to an associated document identifier in one other row of the other rows that is less than the document identifier within the selected row, and another jump point corresponding to another associated document identifier in the one other row that is greater than the document identifier within the selected row.

16. The method of claim 12, further comprising building the inverted query index in an offline state from a set of documents corresponding to advertisements.

* * * * *